Feb. 12, 1929.
G. W. HOLTZMAN
1,701,850
APPARATUS FOR MAKING PRETZEL STICK DOUGH BLANKS
Filed June 4, 1926
8 Sheets-Sheet 1
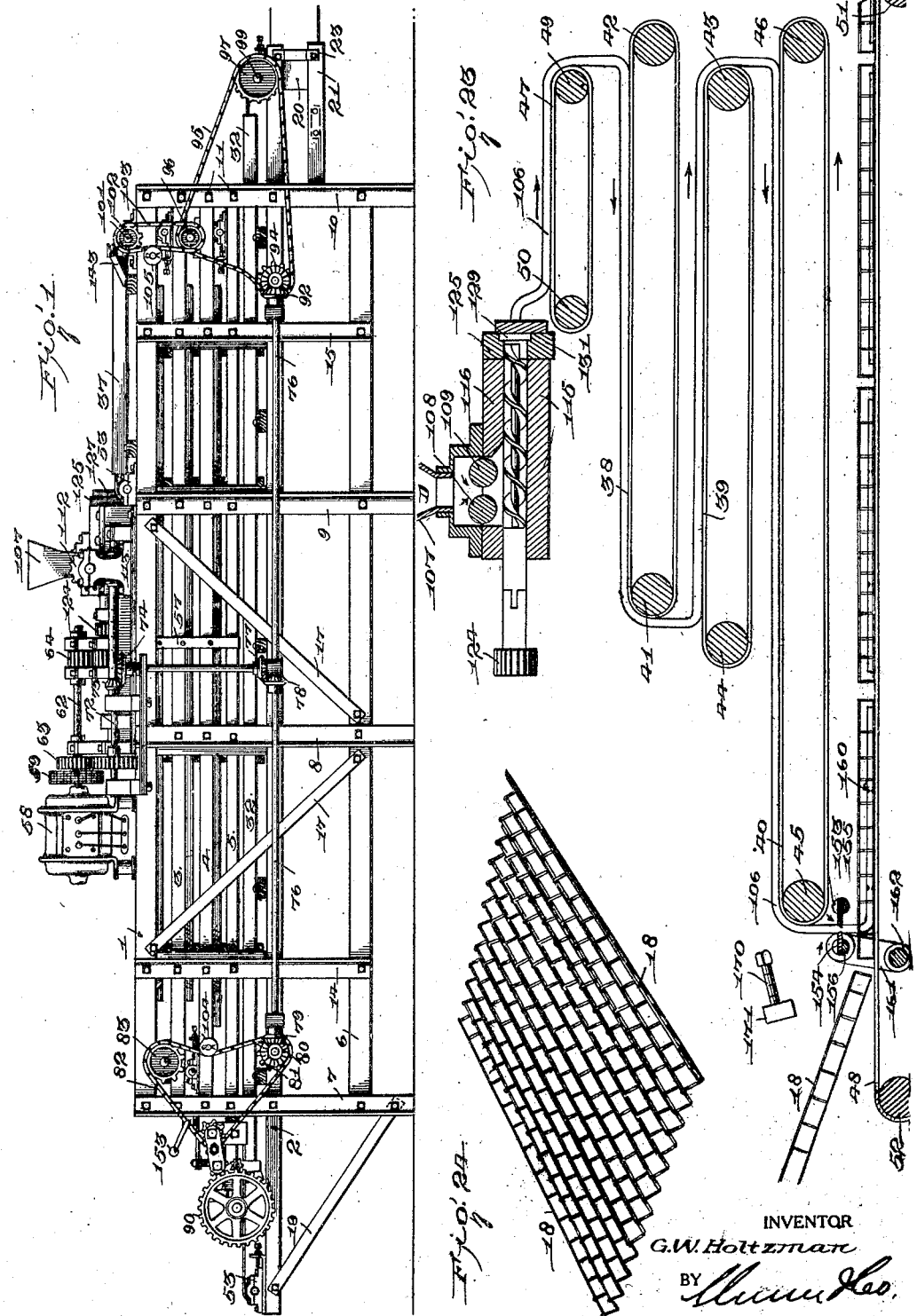
INVENTOR
G. W. Holtzman
BY
ATTORNEYS

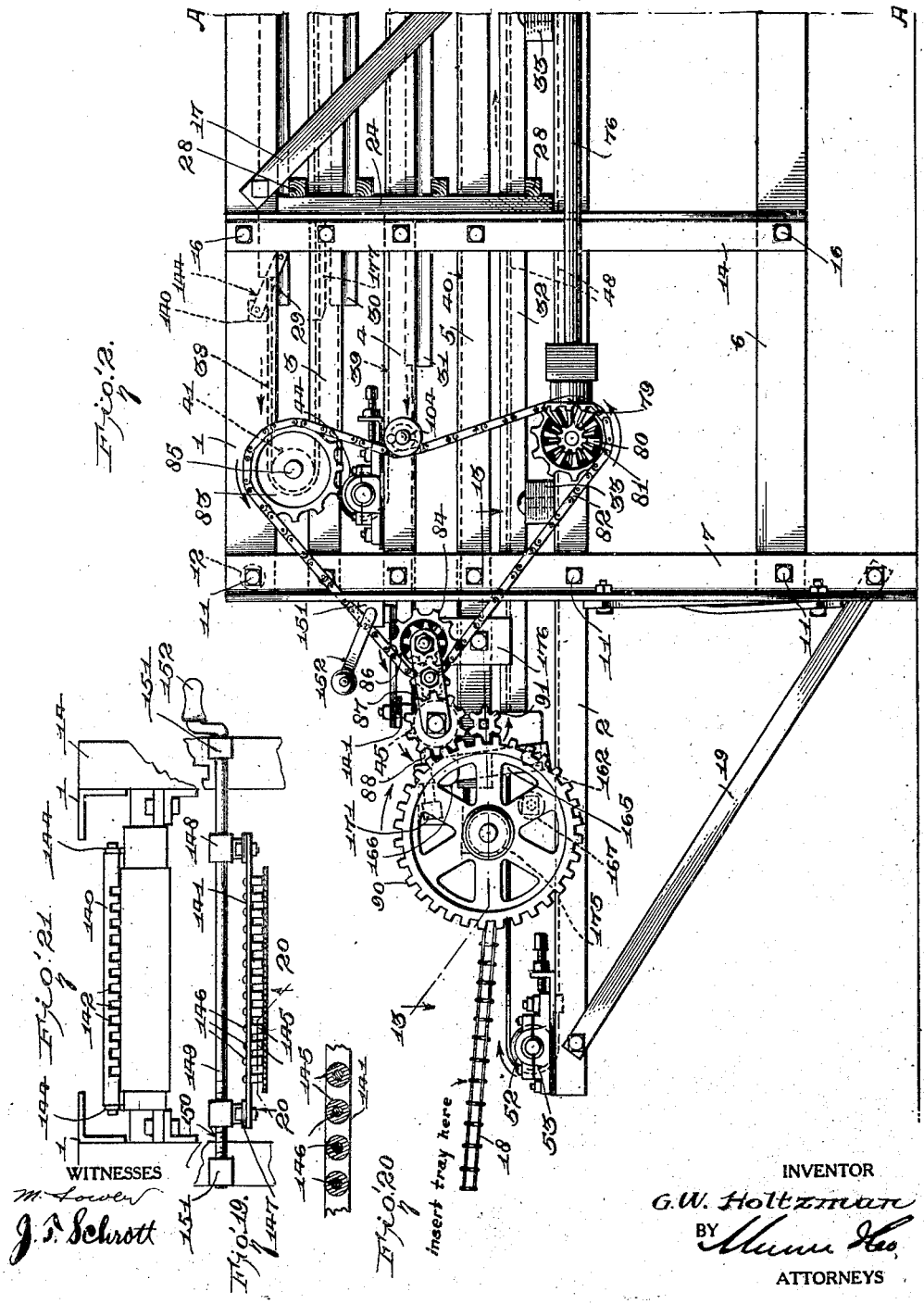

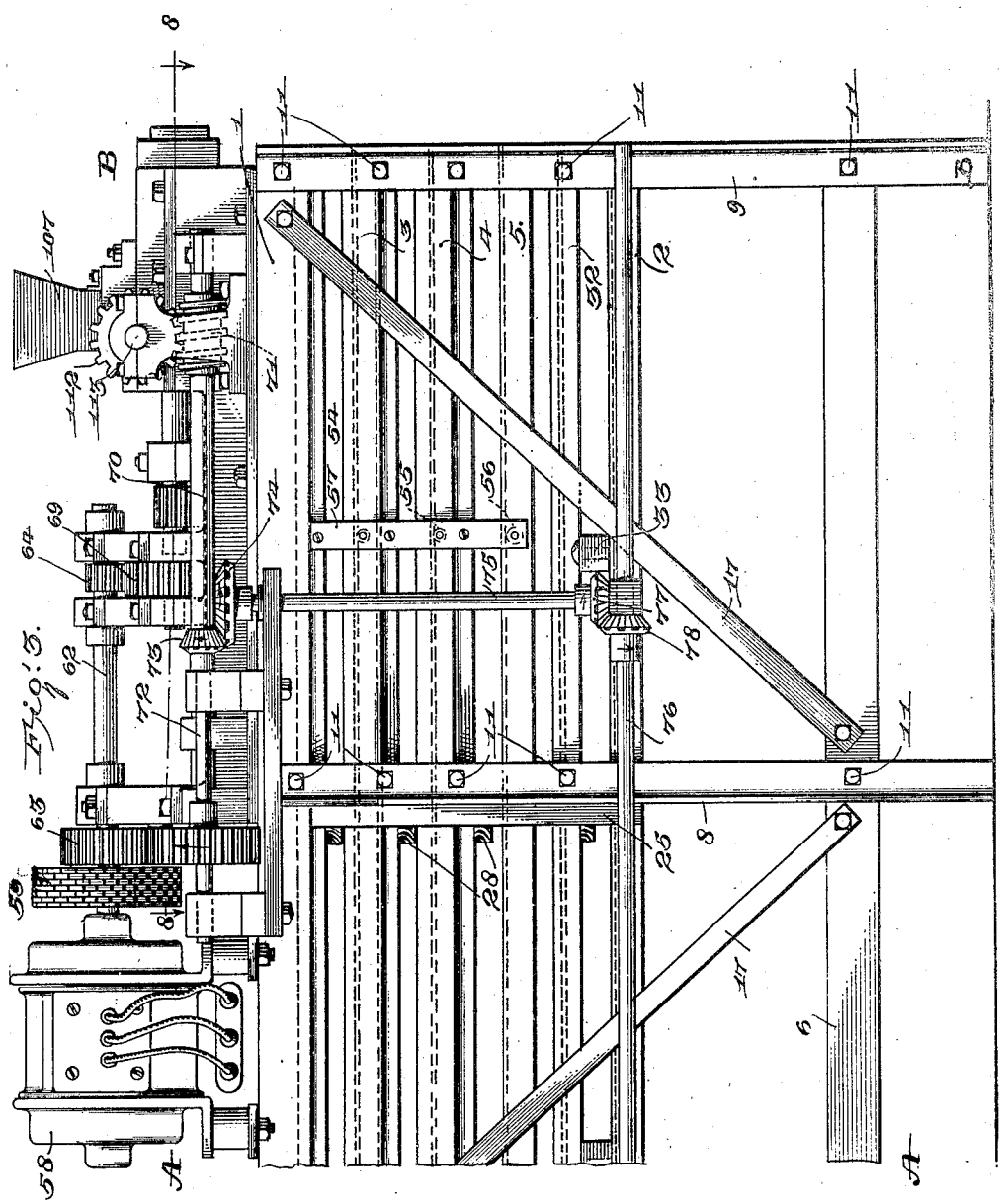

Feb. 12, 1929.
G. W. HOLTZMAN
1,701,850
APPARATUS FOR MAKING PRETZEL STICK DOUGH BLANKS
Filed June 4, 1926       8 Sheets-Sheet 4
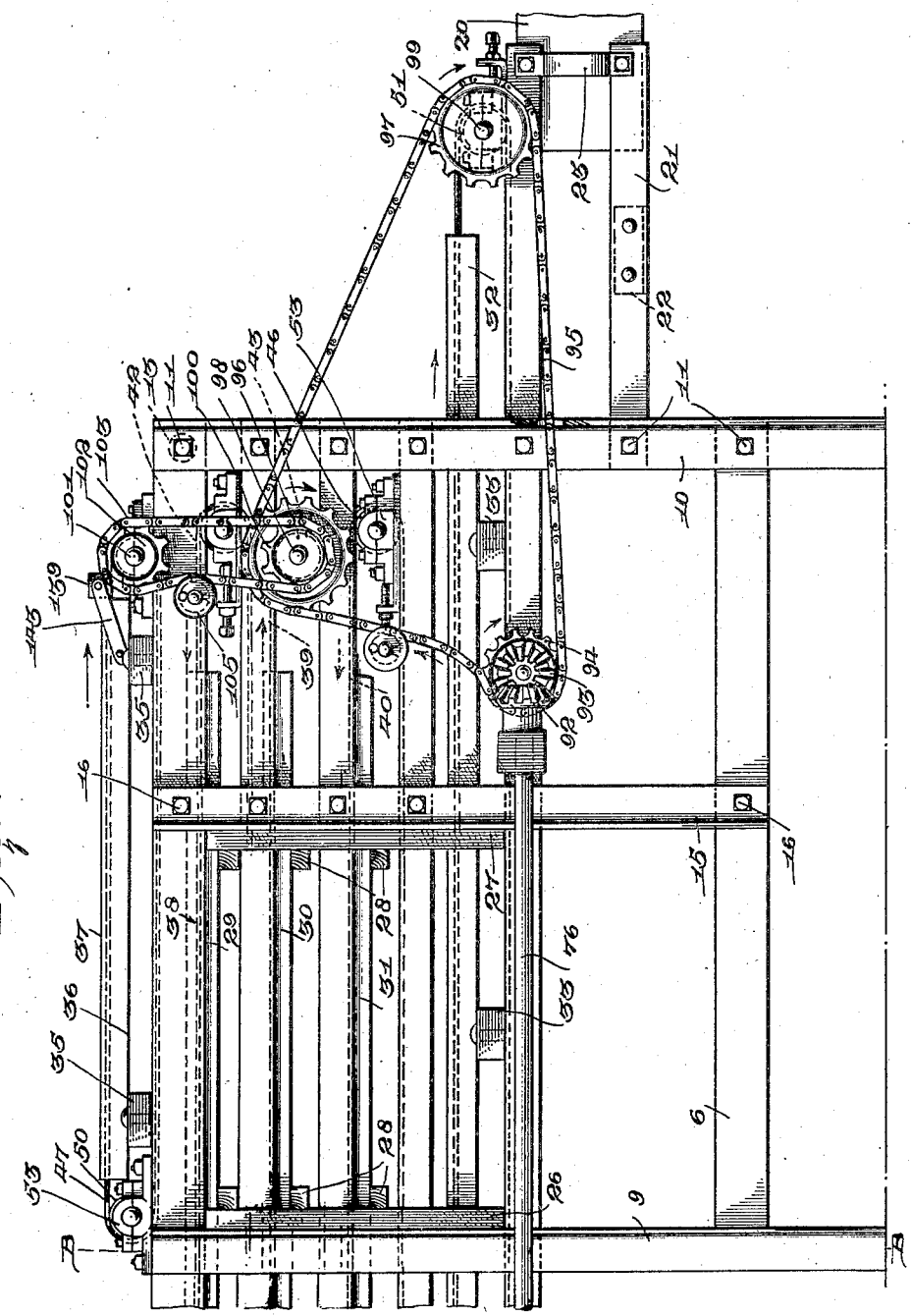
WITNESSES
INVENTOR
G. W. Holtzman
BY
ATTORNEYS Feb. 12, 1929.
G. W. HOLTZMAN
1,701,850
APPARATUS FOR MAKING PRETZEL STICK DOUGH BLANKS
Filed June 4, 1926        8 Sheets-Sheet 5
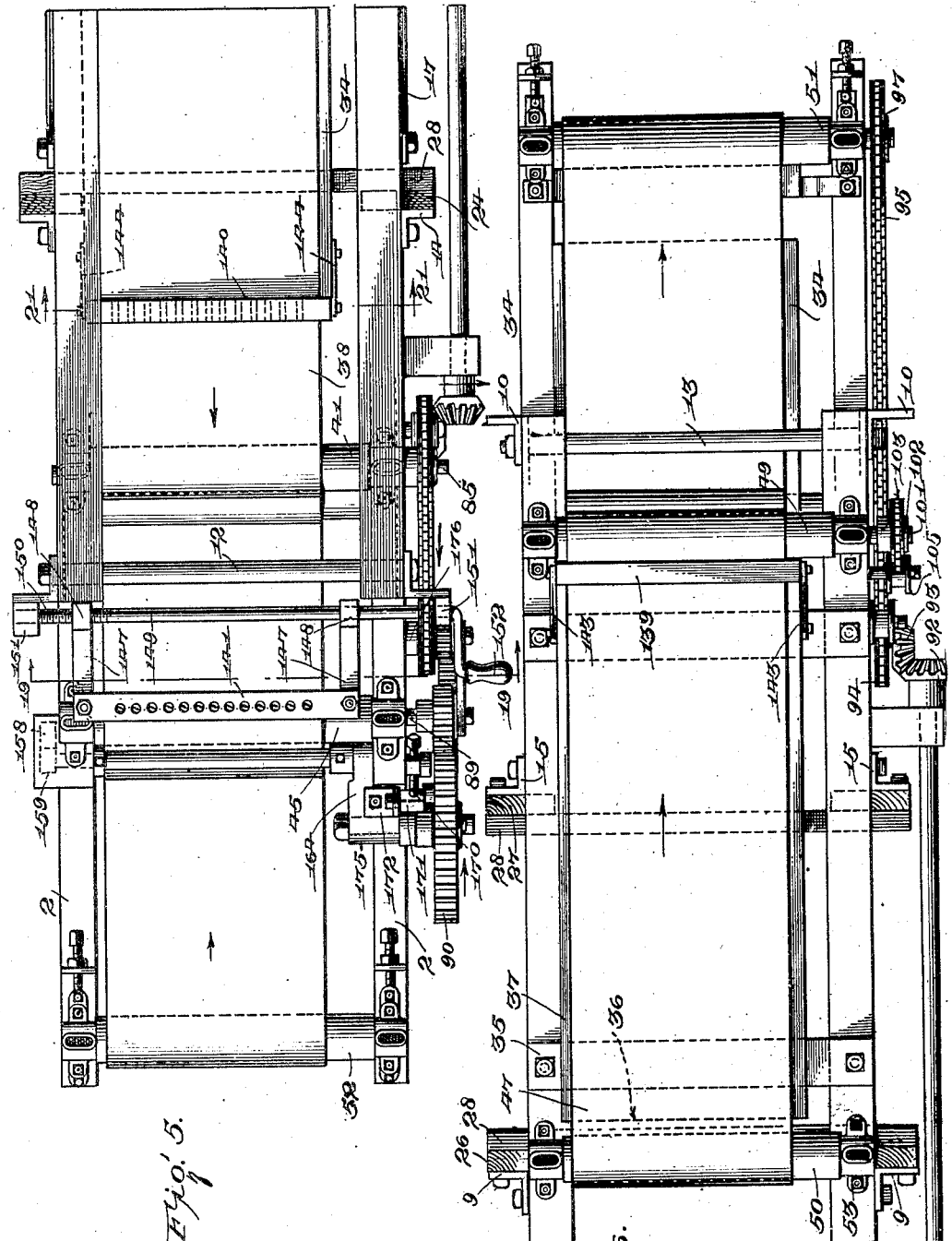
WITNESSES
INVENTOR.
G. W. Holtzman
BY
ATTORNEYS

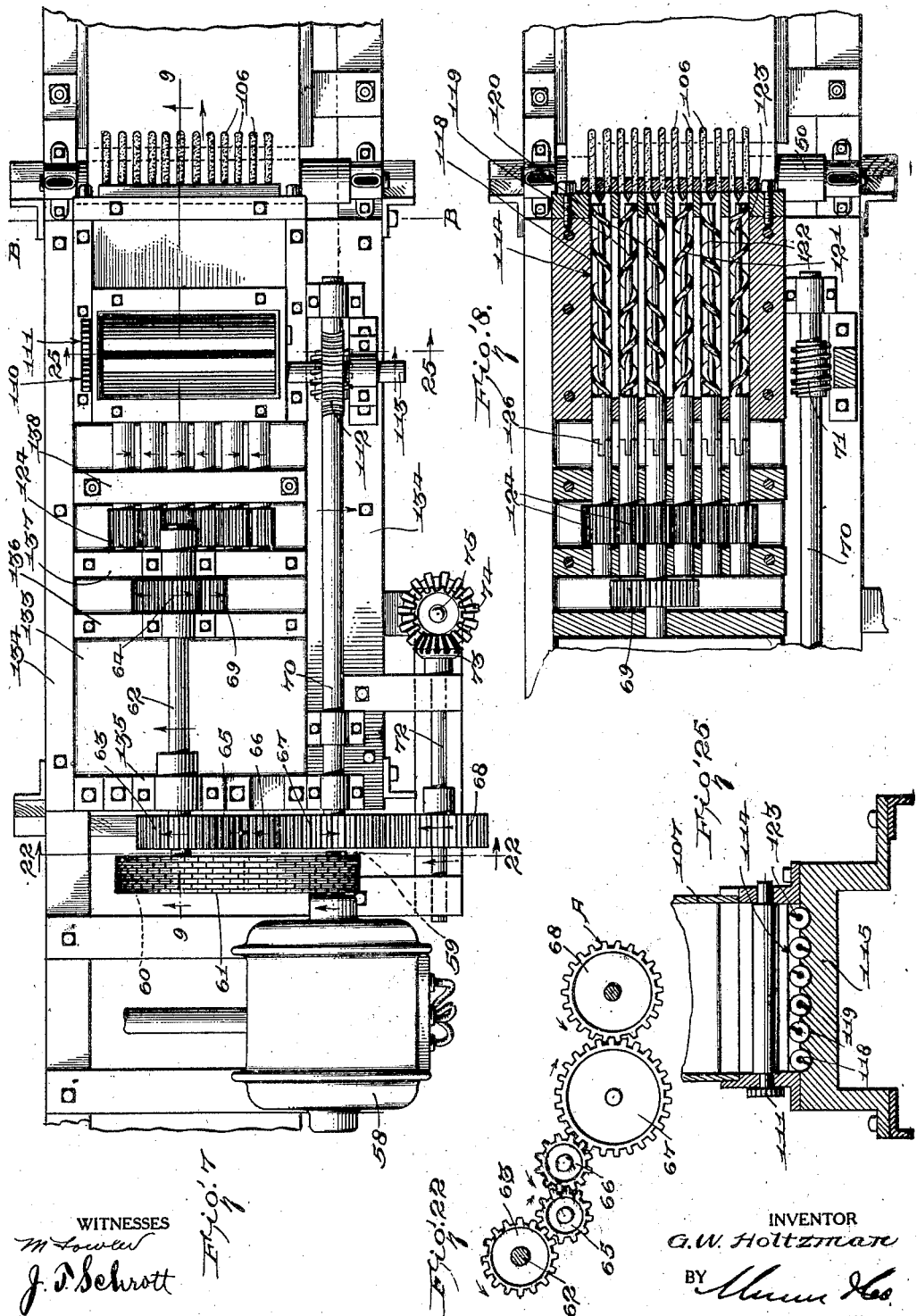

Feb. 12, 1929.  
G. W. HOLTZMAN  
1,701,850  
APPARATUS FOR MAKING PRETZEL STICK DOUGH BLANKS  
Filed June 4, 1926  
8 Sheets-Sheet 7
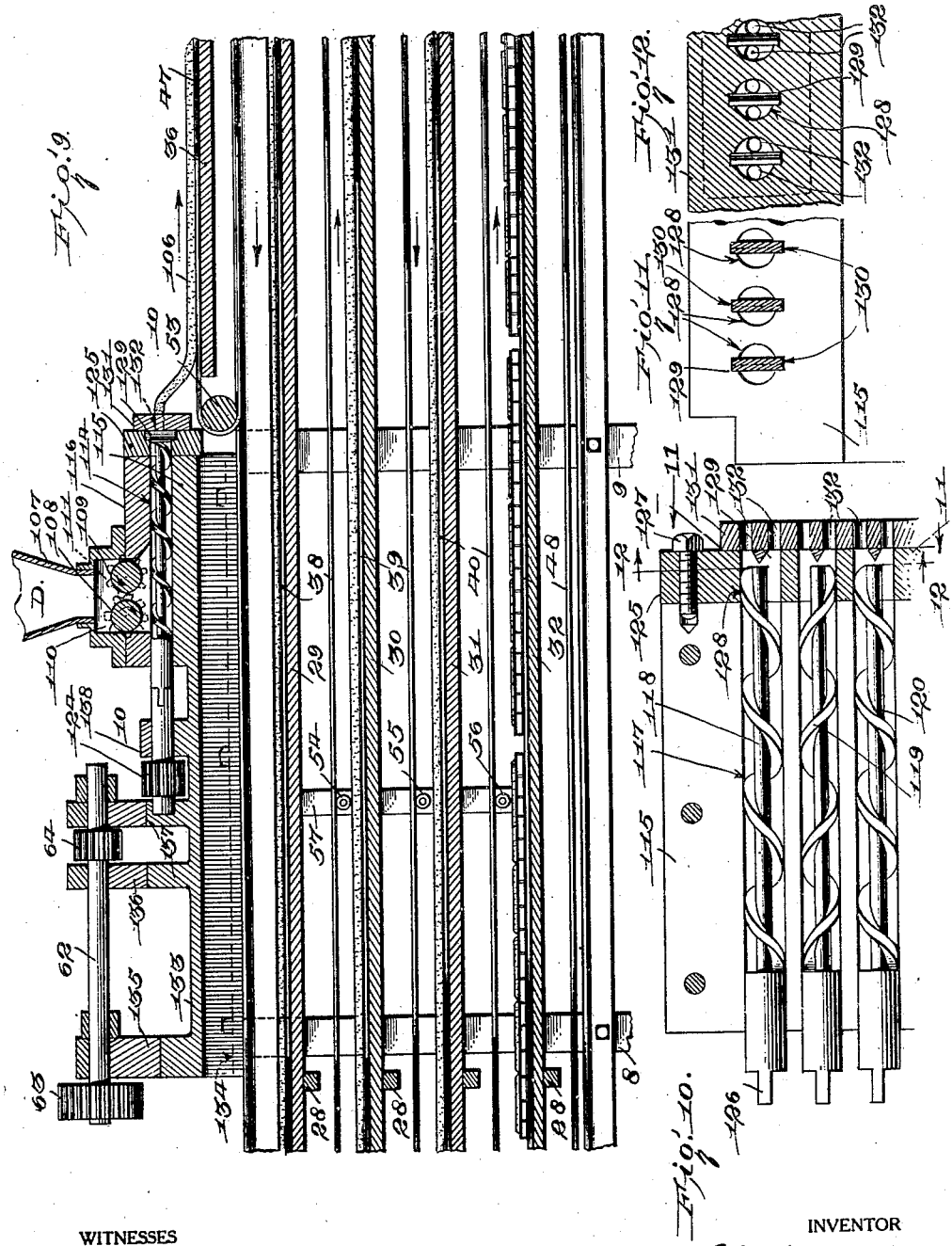
WITNESSES  
INVENTOR  
G. W. Holtzman  
BY  
ATTORNEYS Feb. 12, 1929.
G. W. HOLTZMAN
APPARATUS FOR MAKING PRETZEL STICK DOUGH BLANKS
Filed June 4, 1926
1,701,850
8 Sheets-Sheet 8
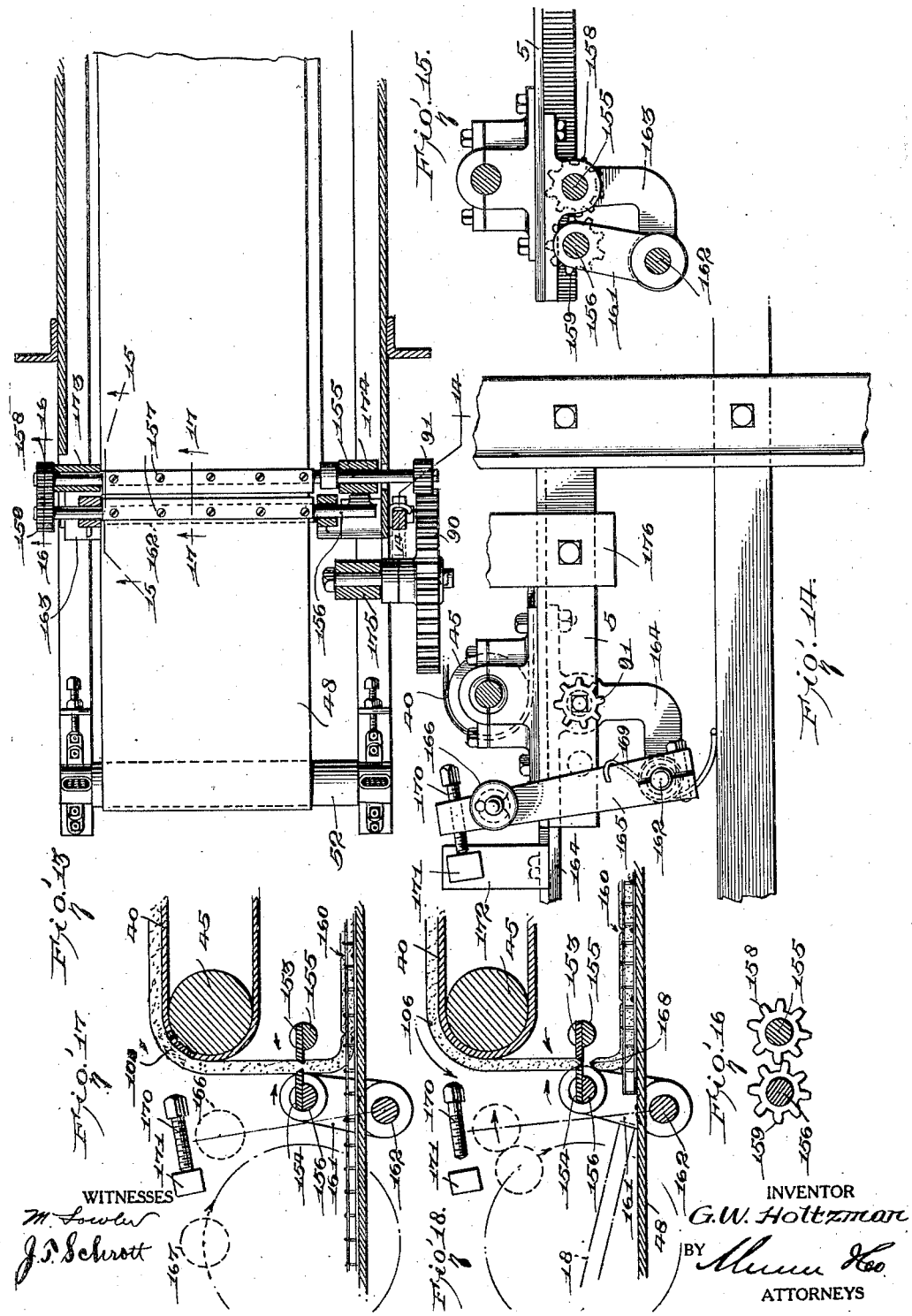
WITNESSES
INVENTOR
G.W. Holtzman
BY
ATTORNEYS Patented Feb. 12, 1929.

1,701,850

UNITED STATES PATENT OFFICE.

GEORGE W. HOLTZMAN, OF MYERSTOWN, PENNSYLVANIA, ASSIGNOR TO PRETZ-STICKS BAKING COMPANY, OF MYERSTOWN, PENNSYLVANIA, A CORPORATION OF PENNSYLVANIA.

APPARATUS FOR MAKING PRETZEL-STICK DOUGH BLANKS.

Application filed June 4, 1926. Serial No. 113,726.

This invention comprises apparatus by which pretzel dough is changed from the lump form as it comes from the mixer to a succession of series of blanks or rods which then are in condition for transportation to an oven to be baked, the invention also residing in the process or steps through which the dough passes prior to assuming the ultimate shape.

Other objects and advantages appear in the following specification, reference being had to the accompanying drawings, in which Figure 1 is a side elevation of the apparatus.

Figures 2, 3 and 4 are side elevations of the front, central and rear sections of the apparatus, these figures when connected at the lines A—A and B—B giving the same view as Figure 1.

Figure 5 is a plan view of the front section in Figure 2.

Figure 6 is a plan view of the rear section in Figure 4.

Figure 7 is a plan view of the central section in Fig. 3.

Figure 8 is a horizontal section taken substantially on the line 8—8 of Figure 3.

Figure 9 is a vertical section taken substantially on the line 9—9 of Figure 7.

Figure 10 is a detail horizontal section taken substantially on the line 10—10 of Figure 9 showing a portion of the extruding device.

Figure 11 is a detail section taken on the line 11—11 of Figure 10.

Figure 12 is a detail section taken on the line 12—12 of Figure 10.

Figure 13 is a horizontal section taken substantially on the line 13—13 of Figure 2.

Figure 14 is a detail view illustrating structure that appears substantially along the line 14—14 of Figure 13.

Figure 15 is a detail cross section taken on the line 15—15 of Figure 13.

Figure 16 is a detail section taken on the line 16—16 of Figure 13.

Figure 17 is a diagrammatic cross section taken on the line 17—17 of Figure 13, the knives being shown as periodically indenting the dough string.

Figure 18 is a similar view illustrating the action when the knives cut into the dough string to produce the rods.

Figure 19 is a cross section taken substantially on the line 19—19 of Figure 5.

Figure 20 is a horizontal section taken on the line 20—20 of Figure 19.

Figure 21 is a cross section taken on the line 21—21 of Figure 5.

Figure 22 is a cross section taken on the line 22—22 of Figure 7.

Figure 23 is a diagram illustrating the steps of the process.

Figure 24 is a detail perspective view of one of the trays upon which the dough blanks or rods are delivered.

Figure 25 is a fragmentary horizontal sectional view taken on the line 25—25 of Figure 7.

It will prove an advantage to the reader to now become acquainted more in detail with the purpose of the invention. The apparatus is used for making the dough blanks which when properly treated and baked are called pretzel sticks. In fact, they are marketed under the trade name "Pretz-Sticks", and they have the characteristics of the familiar pretzel with the exception that the pretzel sticks are short and straight.

The apparatus eliminates a number of the operations usually performed in making pretzels. For example, the operation of forming the pretzels into characteristic shapes which at present is performed manually, is dispensed with. Inasmuch as the latter operation is performed manually, it follows that numerous employees must be kept at work in order to keep up the required production.

The apparatus makes it possible to dispense with all of the employees formerly devoted to forming pretzels, and limits the attendants to three, namely, a tray feeder or one who continuously inserts trays into the feed end of the apparatus; a dough feeder, or one who keeps the hopper supplied with dough; and a tray receiver, or one who continuously takes the filled trays from the delivery end and places them upon racks for transportation to the oven.

In order that the structure may be understood more readily the description is divided into several subjects. First of these comes

The framework.

This comprises top and bottom rails 1 and 2 and three intermediate rails 3, 4 and 5. There is also a lower rail 6 which functions principally in strengthening the framework in a manner clearly shown in Figures 1 to 4 inclusive.

Pairs of uprights 7, 8, 9 and 10 at opposite sides of the framework connect the various rails and provide legs upon which the apparatus stands. The uprights are secured to the various rails as generally indicated at 11, and wherever feasible such securing means may include span rods 12 and 13, (Figs. 5 and 6) which extend from side to side of the framework and hold the various rails in proper spaced relationship. The reader will understand that the far side of the framework is the duplicate of that seen in Figures 1 to 4 inclusive, and although only two of the span rods are actually shown in the drawing, others are used wherever they may seem necessary and will not conflict with moving parts.

Other uprights 14 and 15, situated intermediately of the legs 7, 8 and 9, 10 are secured to the various rails as at 16 and further assist in keeping the various rails properly spaced. Cross pieces 17 serve as braces.

It is noted that the bottom rail 2 is considerably longer than any of the rest. It therefore extends beyond the uprights 7 and 10 (Figs. 2 and 4) defining the location of parts of the apparatus that are hereinafter distinguished as tray feed and delivery ends. The empty trays 18 are introduced at the feed end (Fig. 2) whereupon they are filled with dough blanks or rods during transit through the apparatus and are taken off at the delivery end in Figure 4. The extension of the rail 2 at the feed end is braced as at 19. The bracing for the delivery end serve the additional purpose of supports for a pan or other receptacle 20 into which any dough remnants are discharged. The bracing comprises angle bars 21 upon which the pan is slid (Fig. 4). A batten 22 extends from side to side and braces the angle bars, while pieces 23 support the extensions of the angle bars from the extension of the lower rail 2 at the delivery end.

Battens 24, 25, 26 and 27, suitably secured upon the respective uprights 14, 8, 9 and 15 (Figs. 2, 3 and 4) serve as supports to which a plurality of series of cross plates 28 are secured at the ends. These plates extend across from side to side as the reader can readily understand (Figs. 5 and 6) providing supports for boards 29, 30, 31 and 32 (Fig. 9) upon which the upper strand or component of each of a plurality of conveyors runs.

Inasmuch as the lower board 32 bears the additional weight of the trays 18, it is additionally supported by cross cleats 33 which are suitably affixed at the ends to the bottom rail 2. The side edges of the various boards have upstanding molding 34 providing guides between which the various belts run. Mounted upon the top rails 1 are cross cleats 35 (Fig. 4) which carry a board 36. This board is considerably shorter than the rest, but like the rest it has upstanding molding or guides 37 for the corresponding purpose.

The drier and conveyor belts.

The drier belts are designated 38, 39 and 40 (Figs. 2, 3 and 4). The upper components of these run over the boards 29, 30 and 31 (Fig. 9) as previously stated. The belts are continuous. A drive roller 41 (Fig. 2) and an idler 42 carry the respective right and left ends of the belt 38, and drive the upper component of the belt toward the tray feed end of the apparatus.

Drive and idler rollers 43 and 44 carry the belt 39 and move the upper component thereof over the board 30 to the tray delivering end of the apparatus. Drive and idler rollers 45 and 46 carry the belt 40 and move the upper component thereof over the board 31 toward the tray feed end of the apparatus.

The receiving and tray belts 47 and 48 are distinguished from the other three described by initially receiving the dough string from the extruding device and by receiving and transporting the trays 18 respectively. The first of these belts is carried by drive and idler rollers 49 and 50 (Fig. 4) which move the upper component of the belt over the board 36 toward the delivering end of the apparatus. The second of these belts is carried by drive and idler rollers 51 and 52 which move the upper component over the board 32 in the same direction in order to deliver the filled trays at the proper end of the apparatus. Upon an inspection of the drawings (Figs. 9 and 23) it is seen that the upper components of the various belts alternate in the direction of travel, the purpose of the drier belts 38, 39 and 40 being to lengthen the period of exposure of the dough to the air so that the surface may not be too sticky when the time arrives for indenting and cutting off the rod.

Bearings generally designated 53 support the shafts of the various rollers. The various horizontal rails of the framework serve as supports for the bearings. The various belts are what may aptly be described as in stepped relationship to each other. For example, the idler rollers 42 and 46 (Figs. 4 and 23) are situated in advance of the drive rollers 49 and 43, while the idler rollers 44, 45 and 52 are situated successively in advance of each other, the first of these being in advance of the idler 41. The purpose of this arrangement, as plainly seen in Figure 3, is to provide a continuously moving track for the dough strings, it being necessary to offset the various components of the track so that the dough string may pass and be carried through the various stages. Small rollers 54, 55 and 56 (Figs. 3 and 9) support the lower components of the belts 38, 39 and 40, preventing undue sagging. These rollers are carried by brackets 57 conveniently secured to the edges of some of the boards.

The drive mechanism.

An electric or other motor 58 (Figs. 1 and 3) furnishes the power for the entire apparatus. The shaft of the motor has a pinion 59 which drives a gear 60 by means of a silent chain 61 (Figs. 3 and 7). The gear 60 is carried by one extremity of a shaft 62 (Figs. 3 and 7) which also carries pinions 63 and 64, the former of which constitutes the driver for the gear train 65, 66, 67 and 68 in Figures 7 and 22. The latter is the driver for the augers of the extruding device for which purpose it meshes with the gear 69 mentioned later.

The gear 67 is affixed to one end of a countershaft 70, the other end of which carries a worm pinion 71. The gear 68 is carried by a second counter shaft 72 (Figs 3 and 7) which also carries a bevel pinion 73. This pinion meshes with a bevel gear 74 on the upper end of an upright shaft 75. This shaft drives the line shaft 76 by means of pinions 77 and 78 on the respective shafts. It is from the line shaft that the various belts are driven.

A pinion 79 at the left end of the line shaft drives a bevel pinion 80 and sprocket 81 suitably journaled upon the bottom rail 2. A chain 82 of the sprocket is applied to other sprockets 83 and 84, the former being mounted upon the shaft 85 of the drive roller 41. The latter carries a gear 86 which, by means of the idler 87 drives the gear 88 on the shaft 89 (Fig. 5) of the drive roller 45. The gear 88 also drives a large gear 90 with which the pinion 91 of the indenting and cutting device meshes.

A pinion 92 on the opposite end of the line shaft 75 (Fig. 4) drives the pinion 93 of a sprocket 94 which is also journaled upon the bottom rail 2 of the framework. The chain 95 of this sprocket drives other sprockets 96 and 97 respectively on the shafts 98 and 99 of the drive rollers 43 and 51. The shaft 98 carries a smaller sprocket 100; the shaft 101 of the drive roller 49 carries a sprocket 102. The two sprockets are connected by a chain 103 so that the shafts 98 and 101 rotate in the same direction. Idlers 104 and 105 (Figs. 2 and 4) keep the chains 82 and 103 tight.

The extruding device.

It is this device which converts the shapeless mass of dough into a plurality of strings, the beginning of which is indicated at 106 in Figures 7 and 8. It comprises a hopper 107 into which a lump of dough D is placed by hand or otherwise. Dough is taken from the conventional dough mixer and introduced into the hopper 107 from time to time as needed.

A pair of rollers 108, 109 work the dough downwardly (Fig. 9). These rollers are driven in opposite directions but toward each other (Fig. 9) by meshing pinions 110, 111 (Figs. 7 and 9), motion being derived from the countershaft 70 through the worm pinion 71 and a worm gear 112 on the shaft 113 of one of the hopper rollers.

The action of the rollers 108 and 109 keeps the auger chamber 114 (Figs. 8 and 9) filled with dough. This chamber is formed between the base 115 and the cover 116. The base is formed into six (more or less) longitudinal, parallel and semi-circular concavities 117 (Figs. 10 and 25) in which the lower halves of the series of augers 118, 119, 120, 121, 122 and 123 revolve. The cover has a rectangular depression (Fig. 25) and the foregoing chamber exists between the walls of this depression and the exposed parts of the foregoing concavities and the bridges therebetween.

Each of the augers carries a gear 124 (Figs. 7, 8 and 9). These gears mesh with each other thereby reversing the direction of rotation of the successive augers as indicated by the arrows in Figure 7. This arrangement requires that the augers, beginning with 118 (Fig. 8) must be alternately left and right hand threads in order that the dough in the auger chamber 114 may be fed rearwardly to the end plate 125. The auger shafts are made in two parts, being joined at a tongue and groove connection 126. The components of each shaft are solidly held together but the tongue and groove connections permit replacement of either gear or the auger and avoid the loss of the whole unit should either part break.

The end plate 125 is secured to the base 115 by bolts 127 or other suitable means. This plate has a series of holes 128 which match the concavities 117. The rear ends of the augers 118, 119, etc. extend into the holes (Fig. 10) and stop short of triangular inserts 129 which are situated in vertical positions at the rear of the holes.

These inserts are slightly longer than the diameter of the holes 128 (Fig. 11) the ends of the inserts being seated in recesses 130 above and below the holes. The rear surfaces of the inserts are flush with the rear surface of the plate 125, and the sharp edges are therefore presented and opposed to the various augers as clearly shown in Figure 10. The dough being pressed against the sharp edge of the inserts is spread laterally in the holes 128.

Secured to the end plate 125 is a die-plate 131. This plate has a series of small holes or nozzles 132, there being a pair of these nozzles to each of the larger holes 128 (Figs. 10 and 12). The inserts 129 are situated between each pair of holes (Fig. 12), the laterally spread dough therefore being directed to the nozzles 132 and finally out upon the receiving belt 47 (Figs. 7, 8 and 9).

The base 115 is part of a relatively large casting 133 which extends lengthwise of the framework from a point adjacent to the train of gears 63, 65, etc. (Fig. 7) to a point adjacent to the idler roller 53 of the receiving belt 47 (Fig. 9). The casting is equal in width to that of the framework, and the casting has flanges 134 resting upon the top rail 1 and being secured thereto by suitable means. This casting carries a series of bearings 135, 136, 137 and 138 by the which the shaft 62 (Fig. 7) and the various auger shafts are supported. The gear 69, mentioned before, is carried by one of the auger shafts, and it is by virtue of meshing with the pinion 64 on the shaft 62 that motion is imparted to the various augers.

The guiding means.

With the foregoing description of the extruding device the reader understands that a series of strings of dough 106 (Figs. 7 and 8) are forced out upon the receiving belt 47. Inasmuch as the motion of the belts and the action of the extruding device are continuous, it follows that dough strings pass through the apparatus, first in one direction then the other. The present apparatus has provision for extruding twelve lengths of dough, but provision for more or less may obviously be made. It is necessary to keep the strings separated during passage through the apparatus, and when once separated the strings stay so.

In order to insure the spacing of the dough strings guides or separators 139 (Figs. 4 and 6) 140 and 141 (Figs. 2 and 5) are placed at important points. The first of these extends across the receiving belt 47 near the discharge end thereof. The second is placed near the discharging end of the belt 38. These guides simply consist of wooden strips which are regularly grooved at 142 on the underside (Fig. 21) to provide passages through which the dough strings pass. These guides rest upon the respective belts, and are pivotally carried by pairs of arms 143 and 144 so that they may be swung back upon occasion.

In the case of the last guide 141 the structure is slightly different but its principle is the same. Instead of making it in the form of a grooved wooden strip the guide 141 is composed of a metal bar to the underside of which a plurality of lugs 145 (preferably round) are secured by means of screws 146 (Fig. 19). The lugs are spaced apart to provide passages for the dough strings. The ends of the metal bar or guide 141 are secured to a pair of arms 147 (Fig. 5). These have enlarged heads 148 which are mounted upon a shaft 149. One end of the shaft is threaded at 150 and the adjacent head 148 is correspondingly threaded. The other head is smooth on each side and simply rides upon the correspondingly smooth part of the shaft. The shaft is journalled in bearings 151, and has a crank handle 152. Upon turning the crank handle the guide 141 may be adjusted back and forth across the belt 40 until a suitable position is reached.

The indenting and cutting device.

Traveling along in the forward direction with the last of the drier belts 40 the dough strings 106 pass between the knives 153 and 154 of the indenting and cutting off device. (Figs. 13, 17 and 18). These knives are carried by shafts 155 and 156 which are flattened in order to provide places upon which to secure the knives. Securing means 157 are plainly shown in Figure 13. The shaft 155 carries the pinion 91, mentioned before, which pinion is driven in the counterclockwise direction by the large gear 90 with which it meshes. Meshing gears 158 and 159 (Figs. 13, 15 and 16) respectively on the two shafts cause clockwise rotation of the shaft 156. In other words, the shafts 155 and 156 rotate toward each other (Figs. 17 and 18) so that the dough strings 106 are periodically indented by the knives as at 160.

For this purpose the shafts 155 and 156 are spaced apart, and they continue indenting the dough strings until the time arrives for cutting off a section of the dough strings producing what is herein known as a series of dough rods.

The cutting off action is accomplished by bodily moving the shaft 156 relatively to the shaft 155. Both shafts rotate, but the shaft 155 is relatively stationary. The shaft 156 is journaled in the upper ends of a pair of arms 161. These are suitably carried by an arm shaft 162 that extends crosswise of the framework beneath the upper component of the tray belt 48 and is journaled in fixed brackets 163 and 164 (Figs. 14 and 15). One end of the arm shaft carries an arm 165 (Figs. 2 and 14) upon which a roller 166 is suitably journaled. The large gear 90 carries a corresponding roller 167 (Figs. 2 and 5). Periodic engagement of the two rollers causes displacement of the arm 165 and rocking of the arm shaft 162 so that the knife shaft 156 is moved from the position in Figure 17 to that in Figure 18, causing a severance of the dough strings as indicated at 168.

Passage of the gear roller 167 releases the arm 165 so that a spring 169 (Fig. 14) may press the arm back to the original position.

The arm carries a screw 170 which engages a fixed stop 171 upon a bracket 172 secured on a part of the bracket 164. Adjustment of the screw 170 will vary the initial spacing between the knives 153 and 154 so that the indentations 160 may be made as deep as desired. Adjustments may also be necessary in order to insure a sharp severance of the dough strings.

The provision for relative movement of the shaft 156 necessitates an initial looseness between the pinions 158 and 159. As shown in Figure 16 there is considerable space between the extremities of the teeth on one pinion and the base of the teeth on the other. The amount of relative movement of the shaft 156 is not very great, and by meshing the pinions 158 and 159 as shown the necessary movement may be accomplished without binding of the pinions. The brackets 163 and 164 have enlarged portions 173 and 174 (Figs. 13 and 14) in which the shaft 155 is journaled. A second enlargement 175 of the bracket 164 provides a support for the large gear 90 (Figs. 2 and 13). The brackets 163 and 164 are secured to protruding portions of the intermediate rails 5. One of the same protruding portions carries a bracket 176 upon which the sprocket 84 and gear 86 (Fig. 2) are suitably mounted. Scrapers for the various belts may be provided where necessary, one of such scrapers being shown at 177 in Figure 2. This scraper extends from side to side and may be secured upon an adjacent pair of rails 3 in any suitable manner.

The operation may be readily understood. Dough, as it comes from the mixing machine, is placed into the hopper 107 (Figs. 9 and 23) from time to time as needed whereupon the oppositely revolving rollers 108, 109 force the dough into the auger chamber 114 where the augers 118, 119, etc. move it rearwardly toward the end plate 125 and the die plate 131. The latter has a pair of small holes or nozzles 132 (Figs. 10 and 12) for each of the larger holes 128 into which the respective augers extend. Said pairs of nozzzles are separated by triangular inserts 129 which direct the dough laterally into the small holes.

The result of the action of the foregoing extruding device is to produce strings of dough 106 somewhat larger in diameter than a lead pencil. The receiving belt 47 is relatively short, but the series of drier belts 38, 39 and 40 extend substantially the length of the apparatus. The strings of dough first contact the receiving belt 47 which conveys them rearwardly, it being borne in mind that the action of the extruding device is continuous. The dough strings finally pass forwardly upon the belt 40 whereupon they enter between the knives 153 and 154 (Fig. 17) which rotate with the shafts 155 and 156 producing indentations 160 at places approximately 2½" apart. After the indenting operation has repeated itself perhaps a half dozen times the dough strings are cut through completely as at 158 (Fig. 18) and the indenting operations are repeated on the next advancing parts of the dough strings. The purpose of cutting completely through the dough strings at intervals is to provide dough rods for the wire trays (Figs. 2 and 24) which are fed in at one end of the apparatus.

These wire trays consist of rectangular sections of wire screening of approximately ⅜" or ½" mesh. The section of screening is run through a pair of corrugated rollers that give it a wavy appearance as shown in Figure 24. The action of the rollers produces a series of parallel and longitudinal grooves, there being twelve of these in the present instance to receive the twelve extruded strings of dough 126. The operator feeds the trays in at the proper moment (Figs. 2 and 18) so that the beginning of the dough strings will lay into the various grooves.

The tray travels along with the tray belt 48 and the dough strings line up in the grooves, the indenting operation proceeding all the while. The cutting off act occurs at the proper time, namely when the end of the tray comes beneath the severing knives, and another tray introduced. The filled trays are taken off at the delivering end of the apparatus (Fig. 4) where they are placed upon portable racks and conveyed to the oven. The dough rods are baked during passage through the oven. An attendant at the opposite end of the oven takes the trays as they come out, turns them over and strikes them with a paddle. This both loosens the dough rods and breaks them at the indentations 160. The product then comprises short pretzel sticks approximately 2½" long which are packaged and marketed.

It may be stated that although the apparatus is at present arranged for having loaded trays taken off at the delivering end (Fig. 4) by an attendant it is entirely possible to associate the delivery end with the receiving end of the oven. The operation of making the product will therefore become continuous from the introduction of the fresh dough to the beating off of the baked pretzel sticks. It is also to be understood that the structural features of the apparatus are subject to many changes. For example, the specific form of framework is not necessarily adhered to. The character of the various bearings may be changed. The number of the augers may be varied. The manner of driving the various parts and the specific means for doing the driving are subject to many changes.

As previously stated, the invention lies in the specific process as well as the mechanism. The process is well illustrated in Figure 23 and this showing is merely supplemented by the statement that it is regarded as novel to intermittently indent the dough strings prior to cutting them off into rod lengths in order to facilitate the breaking up process after baking. It would not do to cut off the dough strings in short lengths because they could not be conducted through the caustic solution in which the pretzel dough is immersed prior to entering the oven without floating. It would also be difficult to handle the short lengths of dough if the strings were cut off at each of the indentations. It is therefore most feasible to cut the dough strings off at tray-lengths.

While the construction and arrangement of the improved apparatus is that of a generally preferred form, obviously modifications and changes may be made in the manner already indicated without departing from the spirit of the invention or the scope of the claims.

I claim:—

1. Apparatus of the character described comprising means for attenuating a quantity of plastic material, moving means by which the attenuated material is conducted over a tortuous path subjecting the same to a limited drying action, moving blades between which the material is conducted to be indented at intervals by said blades, and means periodically giving one of the blades a supplementary motion bringing them closer together to completely sever the attenuated material.

2. In an apparatus of the character described, comprising means for attenuating a quantity of plastic material, a moving conveyor on to which the material so attenuated is fed, a pair of revolving blades between which the attenuated material is conducted by said conveyor for periodic indentation by the blades, and means for periodically shifting one of the blades toward the other to perform a cutting action.

3. In an apparatus of the character described, comprising means for attenuating a lump of dough to produce a dough string, a movable conveyor to receive the string, a pair of moving blades between which the string is conveyed by which the string is indented at intervals, and means for imparting a supplementary motion to one of the blades causing the blades to come together and sever the string to produce a rod of predetermined length.

4. In an apparatus for dividing dough strings into sections, a pair of blades, means for conveying the string of dough between said blades, revoluble means by which the respective blades are carried operative to bring the edges of the blades into periodic opposition to produce indentations upon the string as it passes through therebetween, and means for shifting one of the revolving means toward the other to bring the edges of the blades together thereby to cut through the string and produce a rod of predetermined length.

5. In an apparatus for dividing dough strings into sections, a pair of blades revoluble into periodic positions of opposition, and being normally spaced apart to permit passage of the dough string therebtween whereupon indentations are produced in the string at each of said periods of operation, means for conveying a string of dough between said blades, and means for shifting one of the blades causing them to come together at said periods of opposition to cut through the string and produce dough rods.

6. Apparatus of the character described comprising a pair of revoluble blades, means for passing attenuated plastic material between said blades, a rockable element upon which one of the blades is revolubly mounted, and means traveling in a closed path periodically rocking said element to bring the blades together and thereby cut through the plastic material.

7. Apparatus of the character described comprising a pair of revolving blades, means for passing attenuated plastic material between said blades, said blades being so disposed that the edges are spaced apart when they come into opposition thereby producing indentations in the material, rockable means by which one of the revoluble blades is carried, and means for rocking said rockable means bringing the edges of the blades together when in opposition thereby to sever said material into predetermined lengths.

8. Apparatus of the character described comprising a pair of parallel blades, means for passing attenuated plastic material between said blades, revoluble shafts by which the respective blades are carried, a rockable mounting upon which one of the shafts is journaled, said means including an arm, resilient means normally pressing the arm in one direction, stop means limiting the motion of the arm in said direction and maintaining a predetermined space between the cutting edges of the blade when moving into confronting positions thereby producing indentations in said material when said confronting positions are assumed, and means for moving the rockable mounting thereby moving the respective blade toward the other blade when the confronting position is reached to cut off a length of said attenuated material.

9. Apparatus of the character described comprising a pair of blades revoluble toward each other and being arranged to maintain a space between the cutting edges when in confronting positions to produce indentations in plastic material passing between the blades, means for passing plastic material between said blades, rockable means upon which one of the blades is journaled, said means having an arm, and a roller arranged to travel in a closed path of motion periodically engaging the arm to shift the rockable means and move the respective blade toward the other blade and take up the spacing therebetween when in confronting positions thereby to cut off a length of the plastic material.

10. Apparatus of the character described comprising a pair of parallel blades, means for passing attenuated plastic material therebetween, revoluble shafts by which the respective blades are carried, means by which one of the shafts is driven comprising a pinion on said shaft and a driving gear in mesh therewith, rockable means by which the other shaft is carried, said rockable means having an arm, and means carried by the drive gear periodically moving the arm and rocking said rockable means to shift the respective shaft and blade causing the blades to come together when in confronting positions thereby to cut off a length of the attenuated material.

11. Apparatus of the character described comprising a pair of parallel blades, means for passing attenuated plastic material therebetween, a pair of shafts by which the respective blades are carried, said shafts being so placed as to maintain a space between the cutting edges of the blades when in confronting positions thereby to produce indentations in the attenuated material as it passes through, means to rotate one of the shafts comprising a pinion on the shaft and a drive gear with which the pinion meshes, rockable means by which the other shaft is carried having an arm with a roller, means on the drive gear for periodically engaging the roller and rocking the rockable means to move the respective blade toward the other blade causing the cutting edges to meet when in confronting positions thereby cutting off a length of the attenuated material, and meshing pinions carried by the respective shafts by which motion is transmitted from one to the other, said pinions loosely meshing initially in order to allow for the subsequent shifting motion of the one shaft toward the other.

12. Apparatus of the character described having extruding means comprising a hopper for receiving a quantity of plastic material, a die plate having a pair of holes, means for forcing the material received from the hopper toward and through the holes, and means in advance of the holes and situated therebetween deflecting the material laterally toward the holes, cutting means, and means for conveying the extruded plastic material thereto.

13. Apparatus of the character described having extruding means comprising a hopper for receiving plastic material, a die plate having a pair of holes, an end plate having a hole sufficiently large to embrace said pair of holes, an auger for forcing material received from the hopper toward said large hole, and a wedge-shaped insert carried by the end plate extending across the large hole thereof and in advance of said pair of holes for deflecting said material laterally toward said pair of holes, cutting means, and means for conveying the extruded plastic material thereto.

14. Apparatus of the character described having extruding means comprising a base with a semi-circular concavity, a cover for the base having a depression defining an auger chamber, a hopper mounted upon the cover for receiving plastic material, revolving rolls moving the plastic material from the hopper into the auger chamber, an auger situated in said concavity and being revoluble in said chamber, a die plate having a pair of holes, an end plate affixed to the base and cover and carrying the die plate, said end plate having a hole sufficiently large to embrace said pair of holes, said end plate hole also receiving the end of the auger, and a wedge-shaped insert carried by the end plate adjacent to the die plate spreading the material laterally toward said pair of holes when advanced by said auger, cutting means, and means for conveying the extruded material thereto.

15. An apparatus for making pretzel-stick dough blanks comprising means for forming a dough string, means for receiving and conveying said string, means between which the string is conveyed effective to indent successive portions and periodically to cut indented sections of the string into dough rods of predetermined length, and a moving conveyor positioned adjacent the indenting and cutting means upon which trays are successively set in position to receive the indented and cut rods, said trays being substantially equal in length to the cut rods.

GEORGE W. HOLTZMAN.